United States Patent [19]
Frasier, Sr.

[11] 3,784,221
[45] Jan. 8, 1974

[54] AIR RIDE SUSPENSION FOR TRUCKS

[76] Inventor: Van L. Frasier, Sr., 5227 Sportscraft Dr., Dayton, Ohio 45414

[22] Filed: July 24, 1972

[21] Appl. No.: 274,405

[52] U.S. Cl............. 280/124 F, 267/32, 180/24.02
[51] Int. Cl............................................. B60g 11/46
[58] Field of Search................................ 267/32.31; 280/124 F; 180/24.02 D, 24.02 E

[56] References Cited
UNITED STATES PATENTS

| | | | |
|---|---|---|---|
| 3,617,072 | 11/1971 | Turner | 180/24.02 |
| 3,237,957 | 3/1966 | Harbers | 280/6 H |
| 3,361,445 | 1/1968 | Harbers | 267/32 X |
| 2,903,256 | 9/1959 | Weiss | 267/15 A |
| 2,941,816 | 6/1960 | Benson | 280/124 F |

Primary Examiner—Philip Goodman
Attorney—Clarence A. O'Brien & Harvey B. Jacobson

[57] ABSTRACT

An air-ride suspension system for vehicles such as trucks, tractors, trailers, and the like has a spring and an air bag attached to an axle of the vehicle and arranged outside a frame thereof for permitting the axle to be selectively moved toward the frame a distance sufficient to lift a wheel on the axle out of contact with a surface supporting the vehicle. The suspension has a pair of adjustable, pivotally mounted torque arms positioned embracing the spring and arranged in parallel so as to form a parallelogram to prevent the axle from turning over. A shock absorber is arranged in a fixed position between the axle and the frame for absorbing shocks received by the axle. A semi-cylindrical insert is provided for adapting the system to an axle having a square cross section. This insert has a planar face provided with a recess arranged to receive the axle for permitting a beam connecting the air bag to the axle to pivot or tilt the axle and arrange its drive line at a desired angle. A system particularly suitable for use when lifting an axle off the vehicle supporting surface when the axle is not in use has an additional spring in place of the upper torque arm connected between the axle and the frame at points adjacent ends of the first mentioned spring, and arranged in a plane substantially parallel to that spring and spaced therefrom toward the frame.

13 Claims, 6 Drawing Figures

PATENTED JAN 8 1974 3,784,221

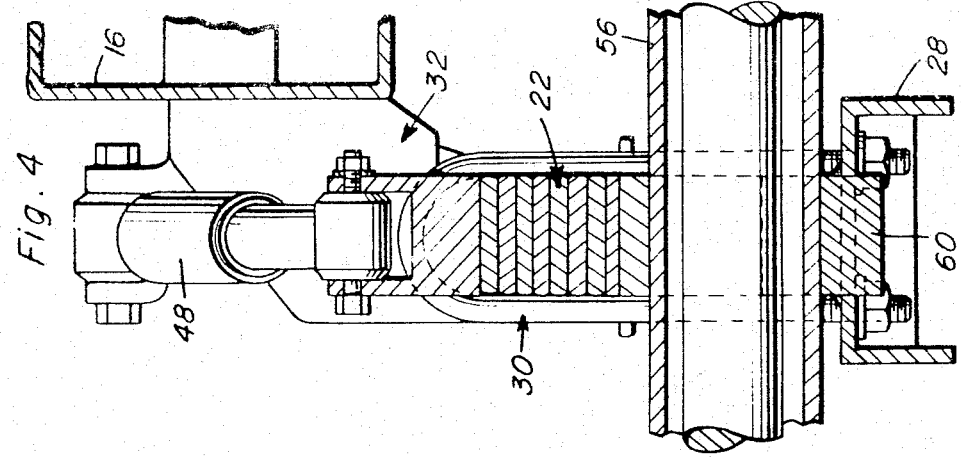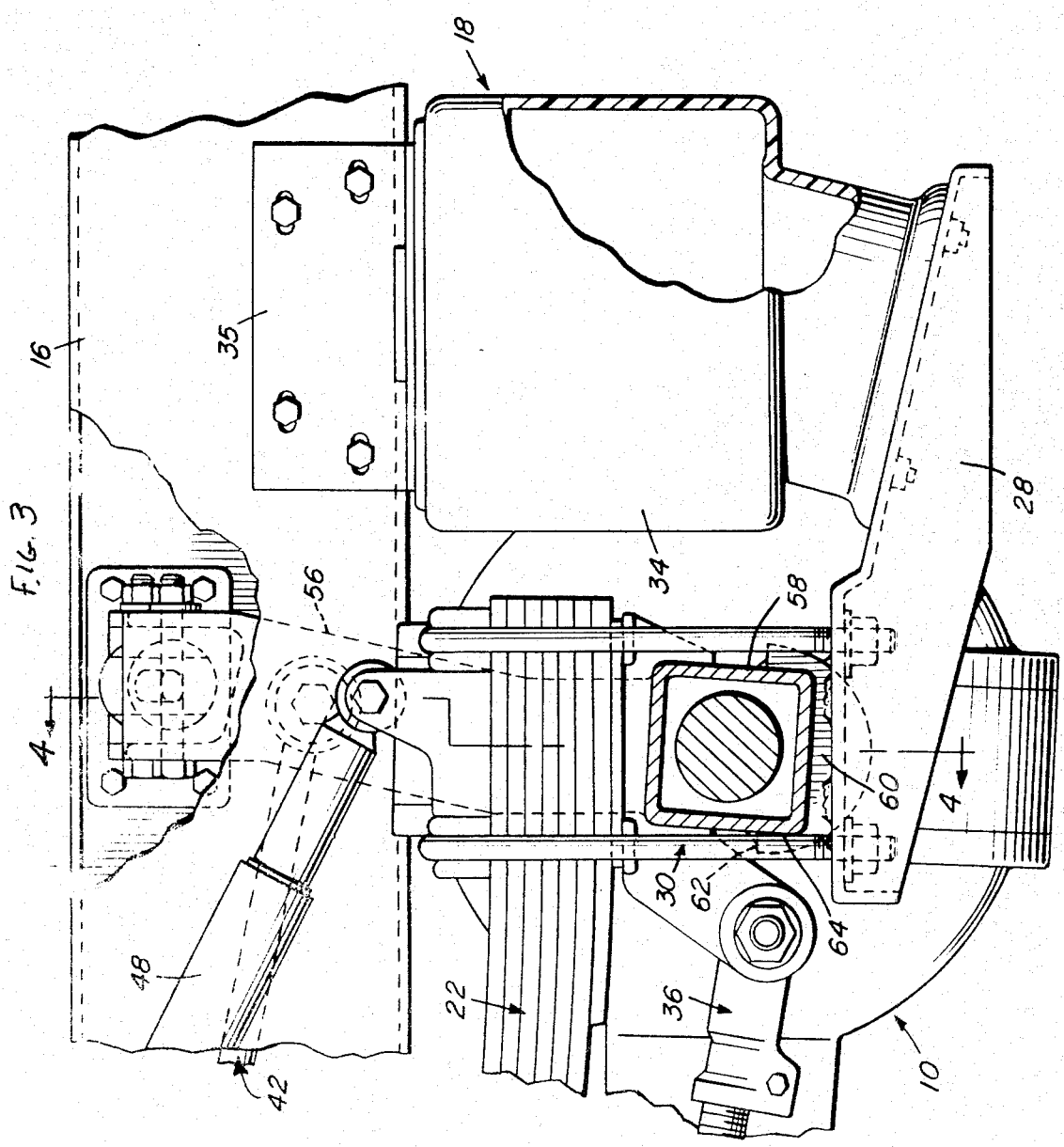

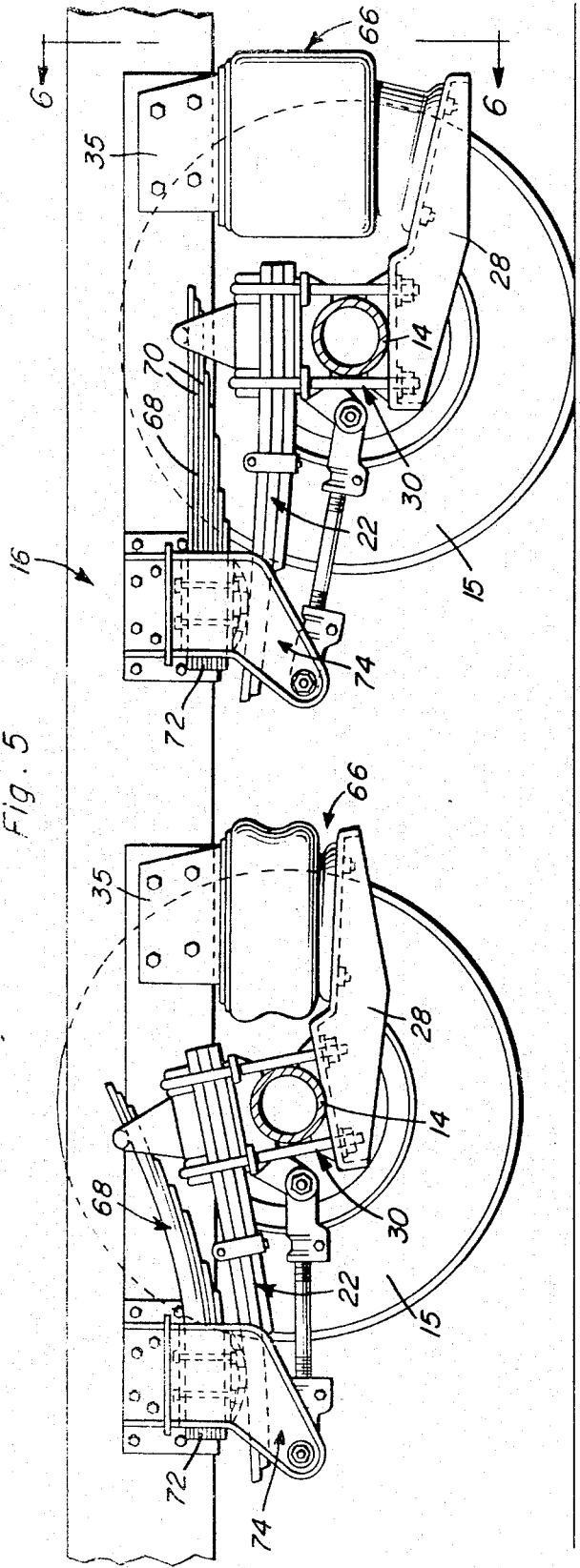
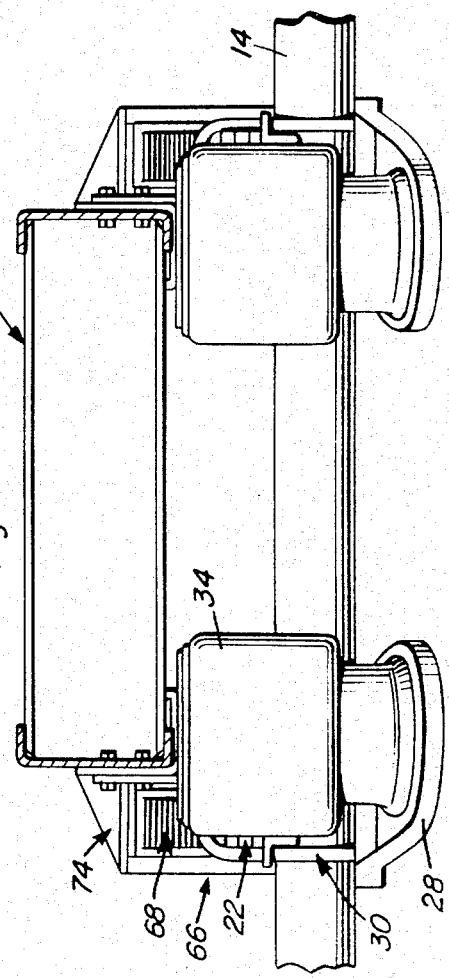
Fig. 5
Fig. 6

AIR RIDE SUSPENSION FOR TRUCKS

BACKGROUND OF THE INVENTION

1. Field of the Invention

This invention relates to air-ride suspension systems for vehicles such as trucks, tractors, trailers, and the like, and in particular to such systems permitting axle lift.

2. Description of the Prior Art

The desirability of providing for vehicles such as cargo vehicles a suspension system which will compensate for different vehicle loadings has led to the development of compound spring suspension assemblies employing an air bag for controlling the height of an associated axle. An example of such an assembly may be found in U.S. Pat. No. 3,237,957. This known arrangement, however, does not permit lifting of an axle sufficient to separate an associated wheel from the vehicle supporting surface due to interference of various elements with respect to the vehicle frame. This advantageous lifting feature of air-ride suspension systems is generally referred to as a "cheater."

SUMMARY OF THE INVENTION

It is an object of the present invention to provide an air-ride suspension system having the advantages of the known arrangement referred to above, but permitting the axle to be selectively lifted from a vehicle supporting surface and improving over-all system stability.

It is another object of the present invention to provide an air-ride suspension system as discussed above which may be adapted to receive axles having rectangular as well as round cross sections.

It is yet another object of the present invention to provide a suspension assembly which may be assembled as a unit and then moved under a vehicle frame.

These and other objects are achieved according to the present invention by providing an air-ride suspension system for vehicles such as trucks, tractors, trailers, and the like. This system preferably has an axle, and an air bag suspension for mounting the axle to a vehicle frame and permitting the axle to be selectively moved toward the frame a distance sufficient to lift a wheel on the axle out of contact with a surface supporting the vehicle.

According to a preferred embodiment of the present invention, the suspension has a partial spring arranged for carrying at least a portion of a vehicle load and formed from a plurality of closely superimposed, generally arched spring leaves having a pair of spaced ends and arranged extending generally parallel to and outside of the vehicle frame in a plane spaced toward the frame from the axle. A beam is attached to the axle also outside the frame and adjacent the spring. This beam extends from the axle in a direction opposite to a direction of extension of the spring to form a cantilever lying in a plane beneath the axle. An air bag is connected between the free end of the beam and the frame.

A pair of adjustable, pivotally mounted torque arms may be arranged bracketing the spring and in parallel with one another for forming a parallelogram. This pair of torque arms prohibits a powered axle from turning over and rubbing against the air bag during starting and stopping of an attached engine.

A shock absorber may be connected between the axle and the frame, and arranged extending generally away from the axle in the direction of the spring for absorbing shocks received by the axle. An advantageous feature of the present invention is that this shock absorber has a fixed position, and it cannot be put on or installed improperly. Further, the shock absorber is installed with the same amount of travel on every installation.

Advantageously, the torque arms and shock absorber may be mounted on a spring hanger to permit assembly of the suspension system as a unit.

When it is desired to employ an axle having a rectangular, particularly square, cross section, an adapter may be provided in the form of a semicylindrical insert seated in the cantilever. This insert may have a planar face provided with a recess arranged to receive the axle. A level plane can in this manner be achieved at all times when such an axle is used, and has various degrees of tilt to maintain the drive line at a desired angle.

In an embodiment according to the present invention particularly suited for axle lift, the upper or top torque arm is replaced by a further spring. This spring is connected between the axle and the frame at points adjacent the ends of the first mentioned spring, and is arranged in a plane substantially parallel to that spring and spaced therefrom toward the frame.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, vertical longitudinal sectional view, partly cut away, showing an embodiment of an air-ride suspension system according to the present invention adapted to receive an axle having a square cross section.

FIG. 4 is a fragmentary, sectional view taken generally along the line 4—4 of FIG. 3.

FIG. 5 is a fragmentary, side elevational view, showing a tandem axle assembly having an air-ride suspension according to the present invention particularly suited for axle lift, and illustrating one axle in a lifted position.

FIG. 6 is a fragmentary, sectional view taken generally along the line 6—6 of FIG. 5.

DESCRIPTION OF THE PREFERRED EMBODIMENTS

Figure 1:
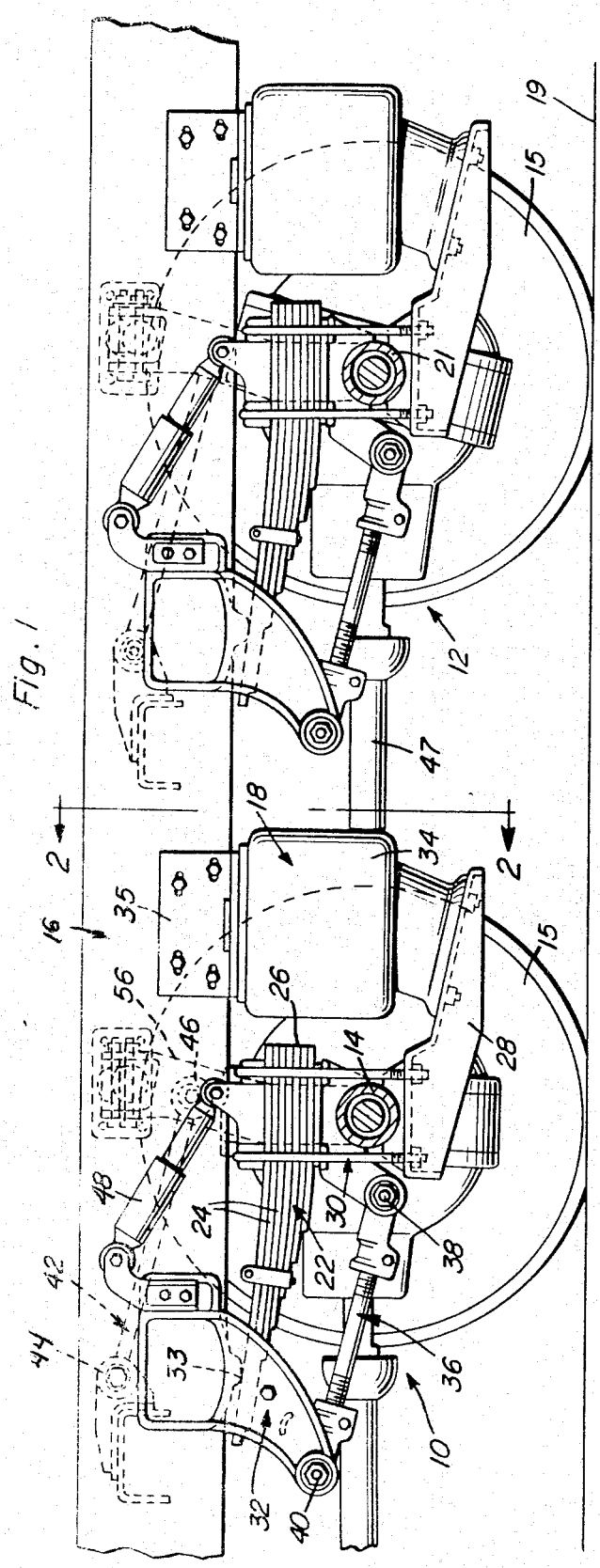
FIG. 1 is a fragmentary, side elevational view showing a tandem axle assembly employing air-ride suspension systems according to the present invention.
Figure 2:
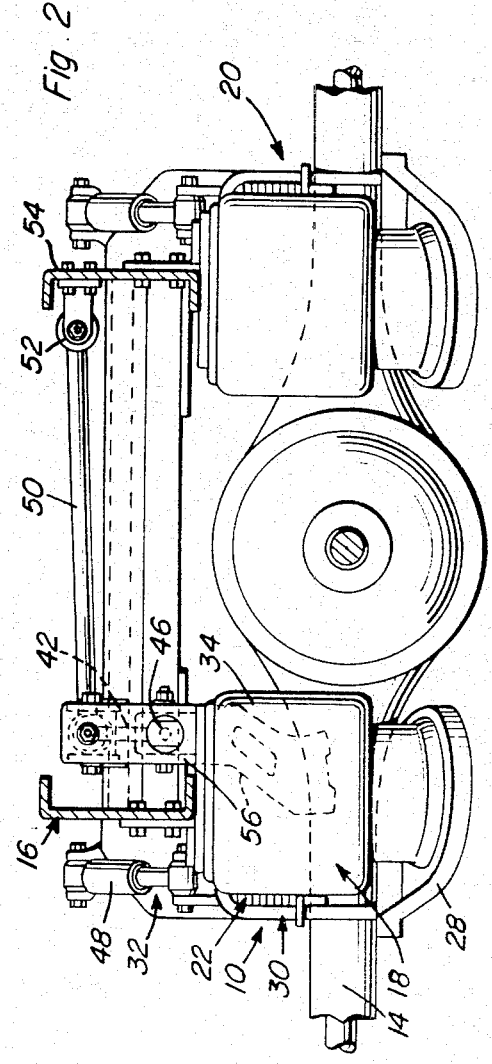
FIG. 2 is a sectional view taken generally along the line 2—2 of FIG. 1.

FIGS. 1 and 2 of the drawings show an air-ride suspension system 10, 12 particularly suited for vehicles such as trucks, tractors, trailers, and the like. Although a pair of systems 10, 12 are shown forming a tandem axle assembly, it is to be understood that a suspension system according to the present invention may be used with only a single axle assembly if desired. System 10 supports an axle 12 for mounting in a known manner a wheel 15 to a conventional vehicle frame 16. An air bag suspension 18 is provided for mounting frame 16 to axle 14, and for permitting axle 14 to be selectively moved toward frame 16 a distance sufficient to lift wheel 15 out of contact with a surface 19 supporting the vehicle. As can be appreciated from FIG. 2, a further air-ride suspension system 20 is provided on the opposite side of frame 16 from system 10 for further supporting axle 14. Since systems 12 and 20 are identical to system 10, only system 10 will be described in detail below. It is to be understood, however, that the description of system 10 applies to systems 12 and 20 as well. Further, it may apply to an additional suspension system (not shown) which is paired with system 12 to help support an axle 21.

Suspension system 10 includes a spring 22 for carrying at least a portion of a load (not shown) on the vehicle. Preferably, spring 22 is a half spring, such as illustrated, formed from a plurality of closely superimposed, generally arched spring leaves 24 having a pair of spaced ends and arranged extending generally parallel to and outside frame 16 in a plane spaced toward frame 16 from axle 14. One end of spring 22 is attached to axle 14 and the other end is attached to frame 16. Leaves 24 are preferably of different lengths, with one ends thereof made flush with one another and arranged at an end 26 attached to axle 14. This arrangement conforms generally to conventional construction of vehicular leaf springs. Suspension 18 is further provided with a beam 28 attached to axle 14 at a point outside of frame 16 and adjacent spring 22, as can be best seen in FIG. 2. This beam 28 extends from axle 14 and forms a cantilever lying in a plane beneath axle 14. Advantageously, beam 28 extends from axle 14 in a direction opposite to a direction of extension of spring 22. A common spring seat 30 attaches spring 22 and beam 28 to axle 14 for rotation therewith. A front hanger bracket 32 is designed to cooperate with the arched spring 22 and provide an allowance which permits lifting of axle 14. Hanger bracket 32 is provided with a symmetrical bearing cam 33 forming a wear pad area which allows axle 14 to lift by causing spring 22 to assume an increasingly steep angle until movement of axle 14 is limited by frame 16. An air bag 34 is connected between the free end of beam 28 and frame 16. An adjustment of air bag 34 fore-and-aft with respect to frame 16 is provided by one or more elongated holes provided in a mounting plate 35 arranged for attaching air bag 34 to frame 16. This adjustment is advantageous when adjustable torque arms or radius rods, such as discussed below, are used with system 10.

Suspension 18 further has an adjustable radius rod or torque arm 36 pivotally connected at a respective one of a pair of spaced ends to axle 14 and hanger 32. The attachment to axle 14 is at a point 38 spaced toward surface 19 from the plane of spring 22, and the pivotal attachment of hanger 32 is also at a point 40 spaced toward surface 19 from the plane of spring 22. By providing an adjustable torque arm 36, adjustment or alignment of axle 14 is made possible. Torque arm 36 is either loose or has an axis about which it can turn or pivot both at hanger bracket 32 and spring seat 30. This again allows for more travel, and makes it easier to lift axle 14. Further, curved spring 22 is not resisting lifting as in known air-ride suspensions. An additional adjustable torque arm 42 is preferably pivotally connected between axle 14 and hanger 32 at respective points 44, 46 which are spaced toward frame 16 from the plane of spring 22. This torque arm 42 is arranged substantially parallel to torque arm 36 for forming a parallelogram therewith.

The arrangement of the upper torque arm 42 in a dual or tandem axle system, as illustrated, is desirable to prevent axle 14 from rolling due to torque applied thereto during the starting and stopping of an engine (not shown) from forces transmitted through a drive shaft 47 and from an application of vehicle brakes (not shown). These forces in the absence of torque arm 42 would cause axle 14 to turn over against air bag 34 and excite an associated height control valve (not shown) to a point where air bag 34 would be inflated to a very high air pressure, resulting in a hard ride. This would defeat the purpose of the air ride system. As a result, a conventional leaf spring unit would be as advantageous, and the height control valve would be quickly worn out by a constant taking in and expelling of air through the valve.

Suspension 18 is still further provided with a conventional shock absorber 48 connected between axle 14 and hanger 32 and extending generally away from axle 14 in the direction of spring 22 for absorbing shocks received by axle 14. Accordingly, system 10 has a fixed position for shock absorber 48, and this element cannot be put on or installed improperly. Further, each shock absorber 48 is installed with the same amount of travel on every system. This is in contrast to prior art systems where there could be interference at the point of installation or a point where an end of the shock absorber attaches to hanger 32. A shock absorber 48, if improperly installed, can bottom out and tear off its mounting bracket. Further, without a fixed position for shock absorber 48 when using a Michigan installation, there would be interference when the suspension system is used as a tandem in conjunction with a centepede installation or in a multiple application.

As can best be seen from FIG. 2 of the drawings, a cross track or stabilizer bar 50 is pivotally connected to a torque arm attachment bracket 52 which is in turn connected to a side rail 54 of frame 16 and to an axle attachment bracket 56. This bracket 56 is attached to axle 14 in a conventional manner, as by welding. The pivotal connections of bar 50 may be in the form of ball joints which will allow a drastic change of location of the bar 50. When axle 14 lifts, the attachment to bracket 52 remains at a fixed position while the attachment to bracket 56 must move constantly as axle 14 raises and lowers. This raising and lowering may be caused either by lifting or the natural movement of the vehicle over depressions, curbings and the like. Further, when lifting, the latter position must change as much as, for example, six inches up and down and fore-and-aft, making for example a rubber bushing insufficient for proper operation. In addition, this arrangement of bar 50 can be used when the system 10 is installed with, or used in conjunction with a powered axle, as is the case in a twin screw or two powered axle truck or tractor. It is noted that connection point 46 of torque arm 42 is actually made to bracket 56 connected to axle 14 for rotation therewith.

A particularly advantageous feature of a system 10, 20 according to the present invention is that it permits springs 22 to be positioned on standard 40 inch centers. All axle manufacturers specify this dimension for standard 34 inch truck frame widths. Thus, standard frames may be used with suspension systems according to the present invention, eliminating the necessity for specially constructed frames.

Referring now to FIGS. 3 and 4 of the drawings, an axle 58 having a rectangular, preferably square, cross section may be used with a suspension system according to the present invention by employing an adapter in the form of a semi-cylindrical insert 60 in place of a lower saddle of spring seat 30. This insert 60 has a planar face 62 provided with a recess 64 arranged to receive axle 58. This arrangement permits a square axle to achieve a level plane at all times, and ensures that the axle 58 has various degrees of tile to maintain a drive line at a desired angle. When installing the unit, beam 28 would be moved around insert 60 to a desired, predetermined position and then, for example, welded in a known manner to insert 60.

FIGS. 5 and 6 illustrate an embodiment of an air-ride suspension system according to the present invention which is particularly suited for axle lift. This system has a suspension 66 provided with an additional spring 68 in place of torque arm 42 of system 10. This spring 68 is connected between axle 14 and frame 16 at points adjacent the ends of its leaves 70. Further, spring 68 is arranged in a plane substantially parallel to spring 22 and is spaced therefrom toward frame 16. Leaves 70 are preferably of different lengths in the manner of the leaves 24 of spring 22, and a one end 72 of the leaves 70 are made flush with one another. This end 72 is preferably connected to frame 16 by means of hanger bracket 32 so as to have an opposed orientation with respect to spring 22.

Suspension systems 10, 20 according to the present invention allow the entire suspension unit to be installed upon the axles and rolled under the frame for fastening to the frame. Truck manufacturers do not like to have holes drilled in the truck frame, and they will do so only when it is absolutely necessary. With a unit according to the present invention, the height control valves (not shown) as well as the shock absorber 58 can be installed and set on an axle such as axle 14 before installation of the system under a frame such as frame 16. Once in place, hangers 32, 74 and the air bag may be attached to frame 16 in a known manner.

With a tandem axle system such as shown in FIGS. 1, 2, 5, and 6 of the drawings, a pair of height control valves (not shown) would be used. The function of these valves is to control the height of the associated axle 14. For example, when a front axle travels over a rise in a road such as surface 19, it chases air from the associated air bag 34 to the respective air bags 34 associated with the rear axle. These air bags are connected together by means of pipe or tubing (not shown), and the height control valves let in air when needed and expel the same into the atmosphere when not required to maintain a constant, predetermined height and pressure in the air bag. This procedure is repeated in reverse when a rear axle hits a rise in the road.

If desired, a manual air control kit may be used with suspension systems according to the present invention. This kit may include a limiting valve, a pressure gauge, a hand control valve, and an air brake protection valve connected in series on a line running between an air supply and the air bags.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An air-ride suspension system for vehicles, comprising, in combination:
   a. an axle;
   b. air bag suspension means for mounting said axle to a vehicle frame, and for permitting said axle to be selectively moved toward the frame a distance sufficient to lift a wheel on said axle out of contact with a surface supporting the vehicle, said suspension means including spring means for carrying at least a portion of a vehicle load;
   c. a spring hanger arranged for attachment to the frame, and wherein said spring means has a generally arched spring leaf having a pair of spaced ends and arranged extending generally parallel to and outside of the frame in a plane spaced toward the frame from said axle, and has a one end attached to said axle and the other end attached to said spring hanger; and
   d. said suspension means further including a beam attached to said axle outside of the frame adjacent said spring means and extending from and forming a cantilever lying in a plane beneath said axle, said beam extending from said axle in a direction opposite to a direction of extension of said spring means from said axle, a common means for attaching the spring means and beam to said axle, an additional spring means connected between said axle and the hanger at points adjacent the ends of said spring leaf, and arranged in a plane substantially parallel to the plane of said spring leaf and spaced therefrom toward said frame.

2. A structure as defined in claim 1, wherein said suspension means further includes an air bag connected to the free end of said beam and arranged for connection to the frame.

3. A structure as defined in claim 2, wherein said suspension means further includes an adjustable torque arm having a pair of spaced ends, with one end pivotally connected to said axle at a point spaced toward the vehicle supporting surface from the plane of said spring means and the other end pivotally connected to the frame also at a point spaced toward the vehicle supporting surface from the plane of said spring means.

4. A structure as defined in claim 3, wherein said suspension means further includes an additional adjustable torque arm pivotally connected between said axle and said frame at points spaced toward said frame from the plane of said spring means, and arranged substantially parallel to said torque arm for forming a parallelogram.

5. A structure as defined in claim 4, wherein said suspension means further includes means connected between said axle and the frame and extending generally away from said axle in the direction of said spring means for absorbing shocks received by said axle.

6. A structure as defined in claim 5, wherein said axle has a rectangular cross section, and said suspension system further includes means in the form of a semi-cylindrical insert seated in said beam and having a planar face provided with a recess arranged to receive said axle for permitting said beam to assume a predetermined relationship with respect to said axle.

7. A structure as defined in claim 6, wherein there are a plurality of closely superimposed spring leaves of different lengths with one ends thereof flush with one another, and said additional spring means has a plurality of closely superimposed, generally arched further spring leaves of different lengths and having a pair of spaced ends with one ends thereof flush with one another, flush ends of said spring leaves being attached to one of said axle and said hanger and the flush ends of said further spring leaves being attached to the other of these members.

8. A structure as defined in claim 7, wherein said axle has a rectangular cross section, and said suspension system further includes means in the form of a semi-cylindrical insert seated in said beam and having a planar face provided with a recess arranged to receive said axle for permitting said beam to assume a predetermined relationship with respect to said axle.

9. A structure as defined in claim 1, wherein there are a plurality of closely superimposed spring leaves of different lengths with one ends thereof flush with one another, and said additional spring means has a plurality of closely superimposed, generally arched further spring leaves of different lengths and having a pair of spaced ends with one ends thereof flush with one another, flush ends of said spring leaves being attached to one of said axle and said hanger and the flush ends of said further spring leaves being attached to the other of these members.

10. A structure as defined in claim 1, wherein said axle has a rectangular cross section, and said suspension system further includes means in the form of a semi-cylindrical insert seated in said beam and having a planar face provided with a recess arranged to receive said axle for permitting said beam to assume a predetermined relationship with respect to said axle.

11. A structure as defined in claim 1, wherein said suspension means further includes an adjustable torque arm having a pair of spaced ends, with one end pivotally connected to said axle at a point spaced toward the vehicle supporting surface from the plane of said spring means and the other end pivotally connected to the frame also at a point spaced toward the vehicle supporting surface from the plane of said spring means.

12. A structure as defined in claim 11, wherein said suspension means further includes an additional adjustable torque arm pivotally connected between said axle and said frame at points spaced toward said frame from the plane of said spring means, and arranged substantially parallel to said torque arm for forming a parallelogram.

13. A structure as defined in claim 1, wherein said suspension means further includes means connected between said axle and the frame and extending generally away from said axle in the direction of said spring means for absorbing shocks received by said axle.

* * * * *